US005520400A

United States Patent [19]

Hung

[11] Patent Number: 5,520,400

[45] Date of Patent: May 28, 1996

[54] STORAGE CASE FOR A DETACHABLE JACK

[76] Inventor: Michael Hung, 9-16, Nan Kan Hsia, Nan Kan, Lu Chu Hsiang, Tao Yuan County, Taiwan

[21] Appl. No.: 352,516

[22] Filed: Dec. 9, 1994

[51] Int. Cl.[6] ..... B62B 1/16

[52] U.S. Cl. ..... 280/47.26; 206/373; 254/1; 254/93 H

[58] Field of Search ..... 206/320, 372, 206/373, 374, 375; 254/1, 93 H, DIG. 2; 15/323; 280/47.26, 47.24, 47.17

[56] References Cited

U.S. PATENT DOCUMENTS

| | | | |
|---|---|---|---|
| 1,784,203 | 12/1930 | Rice | 206/375 |
| 2,935,760 | 5/1960 | Martinec | 15/323 |
| 3,246,359 | 4/1966 | Griffiths | 15/323 |
| 4,554,700 | 11/1985 | Lyman | 15/323 |
| 4,613,042 | 9/1986 | Aeschliman | 206/372 X |
| 4,653,638 | 3/1987 | Lackner et al. | 206/373 |
| 5,074,576 | 12/1991 | Finlay | 280/47.26 X |
| 5,215,318 | 6/1993 | Capraro | 280/47.26 X |

*Primary Examiner*—Anne Marie Boehler
*Assistant Examiner*—Michael Mar
*Attorney, Agent, or Firm*—Wenderoth, Lind & Ponack

[57] ABSTRACT

A storage case includes a case body and a top cover hinged together for holding parts of a detachable jack. The top cover has a beveled front side, three recesses and holes in the beveled front side, three longitudinal steel column chambers of different respective lengths extended from the holes for holding the steel columns of the jack, and three stop strips extending upwardly from respective bottom sides of the recesses for stopping and retaining the steel columns in the longitudinal steel column chambers.

4 Claims, 4 Drawing Sheets

STORAGE CASE FOR A DETACHABLE JACK

BACKGROUND OF THE INVENTION

1. Field of the Invention

The present invention relates to storage cases, and relates more specifically to a storage case for a detachable jack.

1. Description of the Prior Art

Various detachable jacks have been disclosed, and have appeared on the market. When a detachable jack is disassembled, a storage case or like means should be used to hold the parts. Regular storage cases for this purpose are commonly comprised of a case body and a top cover. The case body has compartments for holding the parts of the detachable jack. The top cover has cylindrical bottom chambers for holding the steel columns of the detachable jack. When the storage case is closed, the columns in the bottom chambers of the top cover are stopped against the parts in the compartments of the case body. This structure of storage case is still not satisfactory in function. When the storage case is carried by hand or delivered by a vehicle, the parts stored in the storage case will be oscillated and will rattle and make noise.

SUMMARY OF THE INVENTION

The object of the present invention is to provide a storage case which eliminates the aforesaid drawback. According to the present invention, external steel column chambers are made on the top cover for holding the steel columns of the detachable jack. Because the steel columns of the detachable jack are received in the steel column chambers on the outside of the case and the other parts of the detachable jack are received inside the case, the steel columns do not contact the other parts and generate noise when the storage case is moved.

DETAILED DESCRIPTION OF PREFERRED EMBODIMENT

Figure 1:
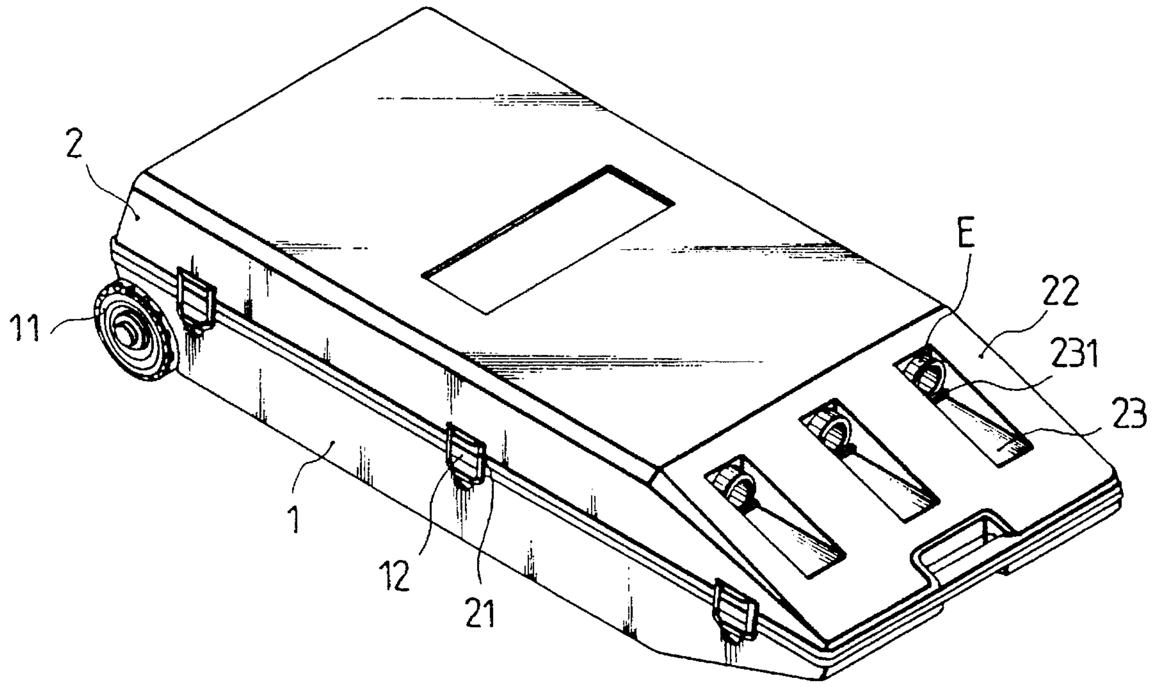
FIG. 1 is a perspective view of a storage case according to the present invention.
Figure 2:
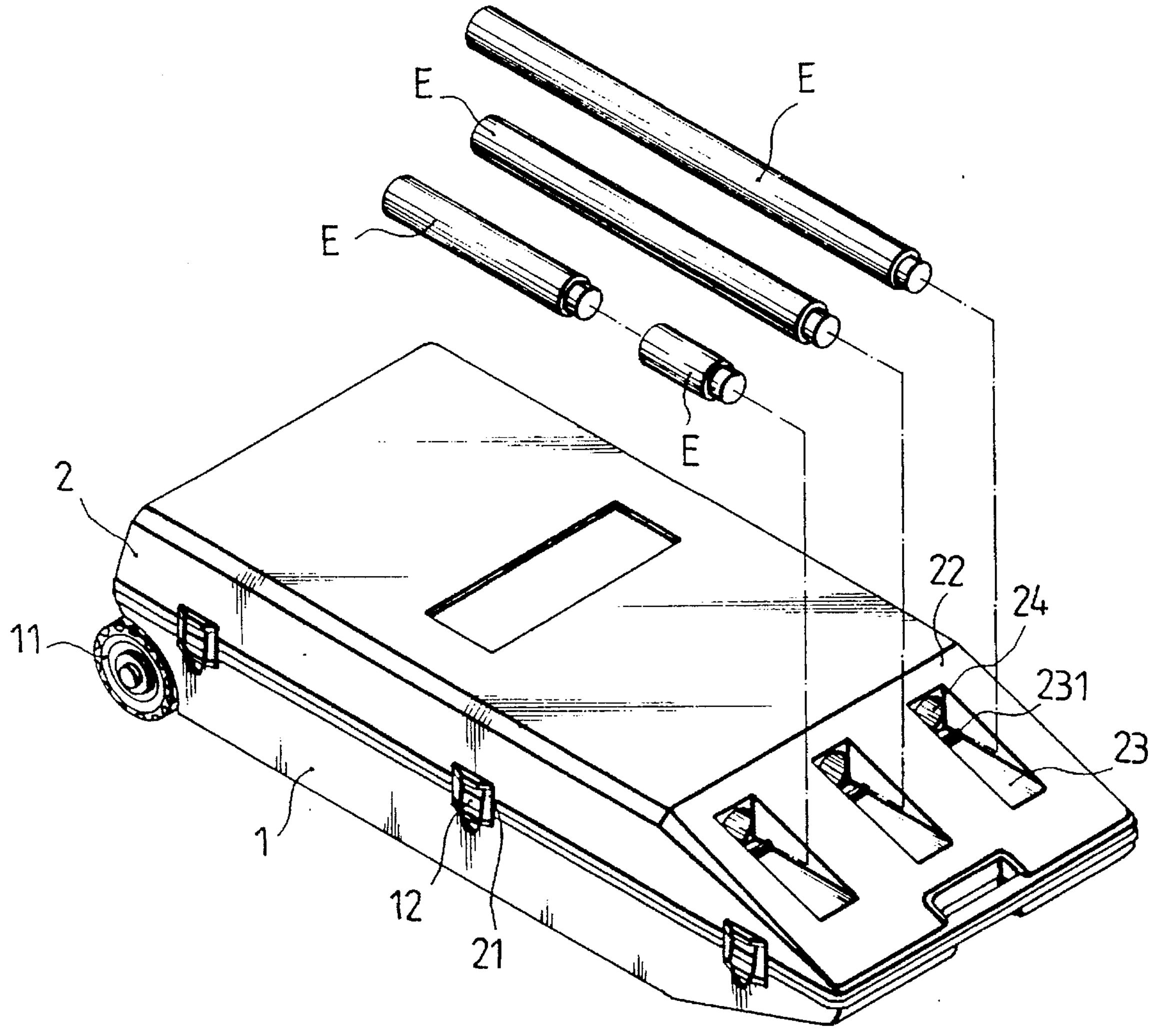
FIG. 2 is a perspective view illustrating a manner of use of the present invention.
Figure 3:
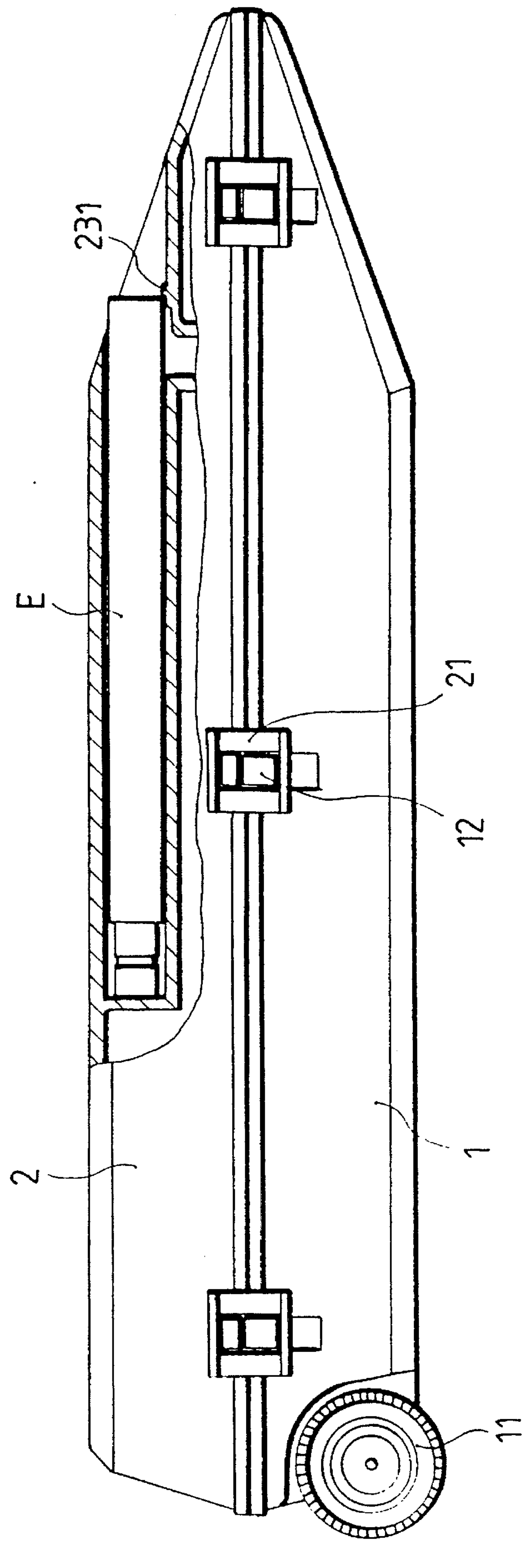
FIG. 3 is a side view, partially in section, of the storage case shown in FIG. 1.
Figure 4:
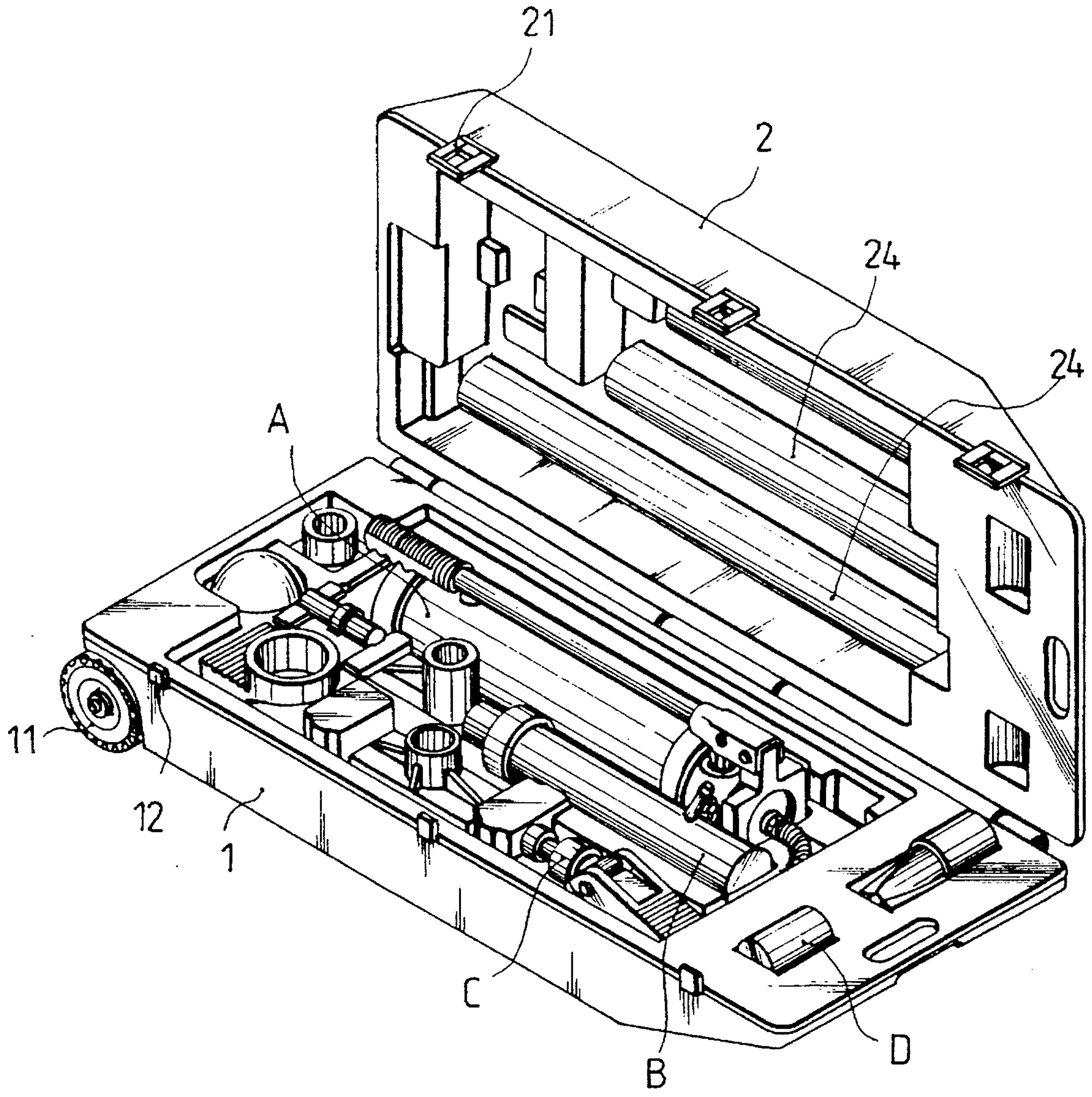
FIG. 4 is a perspective view showing the storage case of FIG. 1 opened.

Referring to the drawings, a storage case in accordance with the present invention is generally comprised of a case body 1 and a top cover 2. The storage case is designed for holding the casing A, support B, expander C, caps D, and steel columns E of a hydraulic jack. The case body 1 has a rear side equipped with wheels 11, one lateral side hinged to the top cover 2, an opposite lateral side having a plurality of latching members such as retainer projections or rods 12, a front side and a top formed with a variety of compartments for holding parts of the hydraulic jack. The top cover 2 has a rear side, one lateral side hinged to the case body 1, an opposite lateral side having a plurality of latching members such as eyed lugs 21 for connection to respective of the retainer rods 12, a beveled front side 22, three rearwardly extending recesses 23 defining respective rearwardly opening holes in the beveled front side 22, three longitudinal chamber forming members 24 defining steel column chambers of different lengths extending inwardly from respective of the holes 23, and three stop strips 231 extending upwardly from respective bottom sides of the recesses.

When the steel columns E of the hydraulic jack are inserted through respective of the recesses and holes 23 into the steel column chambers defined by members 24, they are stopped in position by the respective stop strips 231. When the top cover 2 is closed over the case body 1, the retainer rods 12 and the eyed lugs 21 are fastened together to hold the storage case in the closed position.

What is claimed is:

1. A wheeled or hand carried storage case comprising:

a case body having a forward end, a rearward end, and first and second lateral sides and defining a plurality of compartments for holding parts of a hydraulic jack, said second lateral side having at least one latching member; and a top cover having a forward end, a rearward end, a first lateral side hinged to said first lateral side of said case body, a second lateral side having at least one latching member engageable with said latching member of said case body, thereby to fasten said top cover in a closed position over said case body, a beveled front side portion inclined in a direction upwardly and rearwardly from said forward end, a plurality of rearwardly extending recesses having opening holes formed in said beveled front side portion, a plurality of chamber forming members extending rearwardly from respective ones of said holes and defining respective rearwardly extending chambers which are closed at rearward ends thereof, and a plurality of stop members extending upwardly from bottom sides of respective ones of said recesses, such that columns of the hydraulic jack may be inserted through respective ones of said recesses and said holes into said respective chambers and retained therein by said respective stop members.

2. A storage case as claimed in claim 1, comprising plural respective latching members on said case body and said top cover.

3. A storage case as claimed in claim 1, wherein said plurality of chamber forming members form said respective chambers of different lengths.

4. A storage case as claimed in claim 1, comprising three said recesses, three said holes, and three said chamber forming members.

* * * * *